US010160048B2

(12) United States Patent
Weir et al.

(10) Patent No.: US 10,160,048 B2
(45) Date of Patent: Dec. 25, 2018

(54) ARTICULATING JIG SAW

(71) Applicants:Robert Bosch Tool Corporation, Broadview, IL (US); Robert Bosch GmbH, Stuttgart (DE)

(72) Inventors: J. Alan Weir, Lake Zurich, IL (US); Dan Williams, Chicago, IL (US); Ron Llanes, Lille, IL (US); Steve Oshgan, Des Plaines, IL (US); Peter J. Wierzchon, Morton Grove, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/675,971

(22) Filed: Aug. 14, 2017

(65) Prior Publication Data

US 2017/0341166 A1 Nov. 30, 2017

Related U.S. Application Data

(62) Division of application No. 13/307,048, filed on Nov. 30, 2011, now abandoned.

(51) Int. Cl.
*B23D 51/16* (2006.01)
*B23D 49/16* (2006.01)
*B27B 19/04* (2006.01)

(52) U.S. Cl.
CPC ............ *B23D 51/16* (2013.01); *B23D 49/16* (2013.01); *B27B 19/04* (2013.01)

(58) Field of Classification Search
CPC .......... B23D 51/16; B23D 49/16; B27B 19/04
See application file for complete search history.

(56) References Cited

U.S. PATENT DOCUMENTS 2,337,769 A * 12/1943 Redenbo .............. B23D 49/162
30/377
2,630,148 A * 3/1953 Ferguson ............... B23D 49/16
30/393

(Continued)

FOREIGN PATENT DOCUMENTS

DE     297 17 807 U1    2/1998
EP      0 768 138 A2     4/1997
FR      2 951 659 A1     4/2011

OTHER PUBLICATIONS

International Search Report corresponding to PCT Application No. PCT/IB2012/002709, dated Mar. 18, 2013 (3 pages).

*Primary Examiner* — Sean Michalski
(74) *Attorney, Agent, or Firm* — Maginot, Moore & Beck LLP

(57) ABSTRACT

A power tool includes a motor housing having a motor configured to rotate an output shaft about a drive axis and a gear housing defining a gear compartment. A pinion gear is supported by the gear housing that is coupled to the output shaft for rotation about the drive axis. A bevel gear is supported by the gear housing for rotation about a bevel axis and includes a geared portion that is meshingly engaged with the pinion gear. A crank pin extends from the same side of the bevel gear as the geared portion at a position offset from the bevel axis. An articulating housing is pivotably supported by the gear housing for pivotal movement about the bevel axis. A plunger member is supported by the articulating housing for reciprocating movement along a reciprocating axis. The plunger member includes a yoke end portion coupled to the crank pin.

13 Claims, 8 Drawing Sheets

(56) References Cited

U.S. PATENT DOCUMENTS

| | | | | |
|---|---|---|---|---|
| 3,665,983 A * | 5/1972 | Wagner | B23D 49/167 | |
| | | | 30/376 | |
| 5,212,887 A * | 5/1993 | Farmerie | B23D 49/165 | |
| | | | 30/392 | |
| 5,832,611 A * | 11/1998 | Schmitz | B23D 49/11 | |
| | | | 30/392 | |
| 5,940,977 A * | 8/1999 | Moores, Jr. | B23D 49/11 | |
| | | | 30/392 | |
| 6,098,288 A * | 8/2000 | Miyagawa | H02K 33/16 | |
| | | | 30/210 | |
| 6,138,364 A | 10/2000 | Schmitz | | |
| 6,264,211 B1 * | 7/2001 | Granado | B23D 57/0076 | |
| | | | 173/29 | |
| 6,550,147 B1 * | 4/2003 | Fishlock | B23D 49/11 | |
| | | | 30/371 | |
| 6,671,969 B2 * | 1/2004 | Phillips | B23D 49/11 | |
| | | | 30/377 | |
| 7,096,589 B2 | 8/2006 | Phillips et al. | | |
| 7,204,026 B2 | 4/2007 | Phillips et al. | | |
| 7,251,896 B2 * | 8/2007 | Khubani | B26B 19/02 | |
| | | | 30/199 | |
| 7,370,423 B1 * | 5/2008 | Huang | A01G 3/065 | |
| | | | 30/193 | |
| 7,430,807 B2 | 10/2008 | Saegesser et al. | | |
| 7,752,760 B2 * | 7/2010 | Baskar | A01G 3/0417 | |
| | | | 30/210 | |
| 7,818,887 B2 | 10/2010 | Saegesser et al. | | |
| 7,926,585 B2 | 4/2011 | Pozgay et al. | | |
| 8,205,342 B2 * | 6/2012 | Doumani | B23D 49/167 | |
| | | | 30/392 | |
| 8,291,603 B2 * | 10/2012 | Saegesser | B23D 51/16 | |
| | | | 30/392 | |
| 8,549,762 B2 * | 10/2013 | Oberheim | B23D 51/16 | |
| | | | 30/392 | |
| 2005/0016001 A1 * | 1/2005 | Griep | B23D 51/16 | |
| | | | 30/394 | |
| 2006/0288594 A1 * | 12/2006 | Delfini | B23D 49/11 | |
| | | | 30/517 | |
| 2013/0133210 A1 * | 5/2013 | Weir | B23D 49/16 | |
| | | | 30/374 | |

* cited by examiner

ARTICULATING JIG SAW

CROSS-REFERENCE TO RELATED APPLICATIONS

This application is a divisional application of U.S. application Ser. No. 13/307,048 entitled "ARTICULATING JIG SAW" by Weir et al., filed Nov. 30, 2011, the disclosure of which is hereby incorporated herein by reference in its entirety.

TECHNICAL FIELD

The present disclosure relates generally to power tools, and particularly to power saws, such as jig saws, having a reciprocating blade.

BACKGROUND

In general, power tools, such as jig saws and reciprocating saws, have a motor that drives an output shaft to rotate. The output shaft of the motor in turn is coupled to a yoke mechanism that is configured to convert the rotational movement of the output shaft into a linear movement that is used to drive a plunger to reciprocate along a reciprocating axis. A blade is attached to the plunger so that the reciprocating movement is used to drive the blade to perform cutting operations on a workpiece. In jig saws, the plunger is typically oriented perpendicular to the drive axis of the motor while in reciprocating saws the plunger is oriented generally parallel to the drive axis of the motor. The different orientations of the plungers of jig saws and reciprocating saws allows each of these tools to perform different types of cutting jobs.

Some previously known power tools have been designed to have a plunger that can be oriented both perpendicularly, like a jig saw, and parallel, like a reciprocating saw. However, the drive assembly for such tools typically results in the reciprocating axis of the plunger and saw blade being offset from the drive axis of the motor to accommodate the components of the drive assembly. In addition, multiple bearing assemblies are typically required to maintain the plunger in alignment with the reciprocating axis.

What is needed therefore is a power saw, such as a jig saw or reciprocating saw, that enables the plunger of the saw to be pivoted with respect to the drive axis of the motor while maintaining the plunger in alignment with the drive axis and that does not require a complicated bearing assembly to maintain the plunger in alignment with the drive axis.

SUMMARY

In accordance with one embodiment, a power tool includes a motor housing having a motor configured to rotate an output shaft about a drive axis, and a gear housing defining a gear compartment. A pinion gear is supported by the gear housing that is coupled to the output shaft for rotation about the drive axis. A bevel gear is supported by the gear housing for rotation about a bevel axis perpendicular to the drive axis, the bevel gear being meshingly engaged with the pinion gear in the gear housing portion. A crank pin extends from the bevel gear at a position offset from the bevel axis. An articulating housing is pivotably supported by the gear housing for pivotal movement about the bevel axis. A plunger member is supported by the articulating housing for reciprocating movement along a reciprocating axis. The plunger member includes a yoke end portion coupled to the crank pin. The reciprocating axis and the drive axis reside in the same plane throughout pivotal movement of the articulating housing with respect to the gear housing.

DETAILED DESCRIPTION

Figure 1:
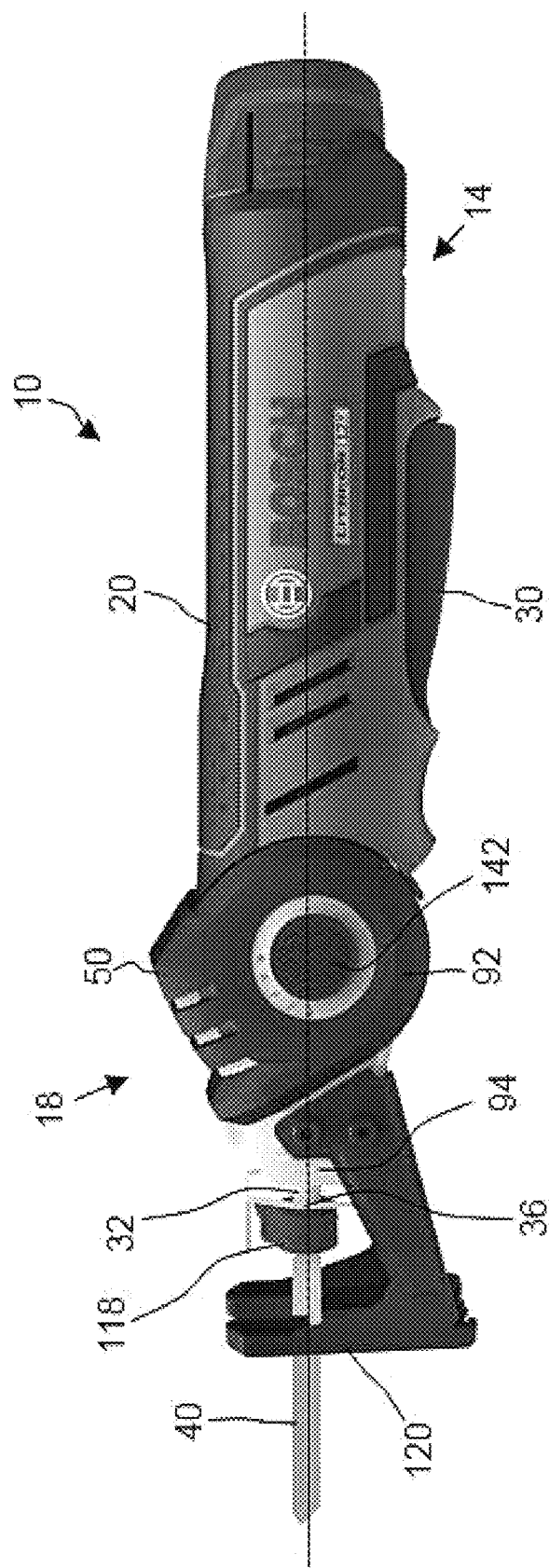
FIG. 1 is a side view of an embodiment of an articulating jig saw with the plunger of the jig saw oriented inline with the drive axis of the jig saw.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

FIGS. 1-9 depict an embodiment of a power tool comprising an articulating jig saw 10 in accordance with the present disclosure. The jig saw 10 includes a main body portion 14 and an articulating head portion 18. The main body portion comprises a main housing 20, or motor housing, that supports and retains a motor 22, a battery 28, an articulating drive assembly, and associated electronics for powering the jig saw 10. In one embodiment, the rechargeable battery 28 comprises a lithium-ion battery. The jig saw may alternatively be powered by an external power source such as an external battery or a power cord (not shown). The main body portion includes a trigger 30 configured to selectively connect power from the battery, or other power source, to the motor.

Figure 2:
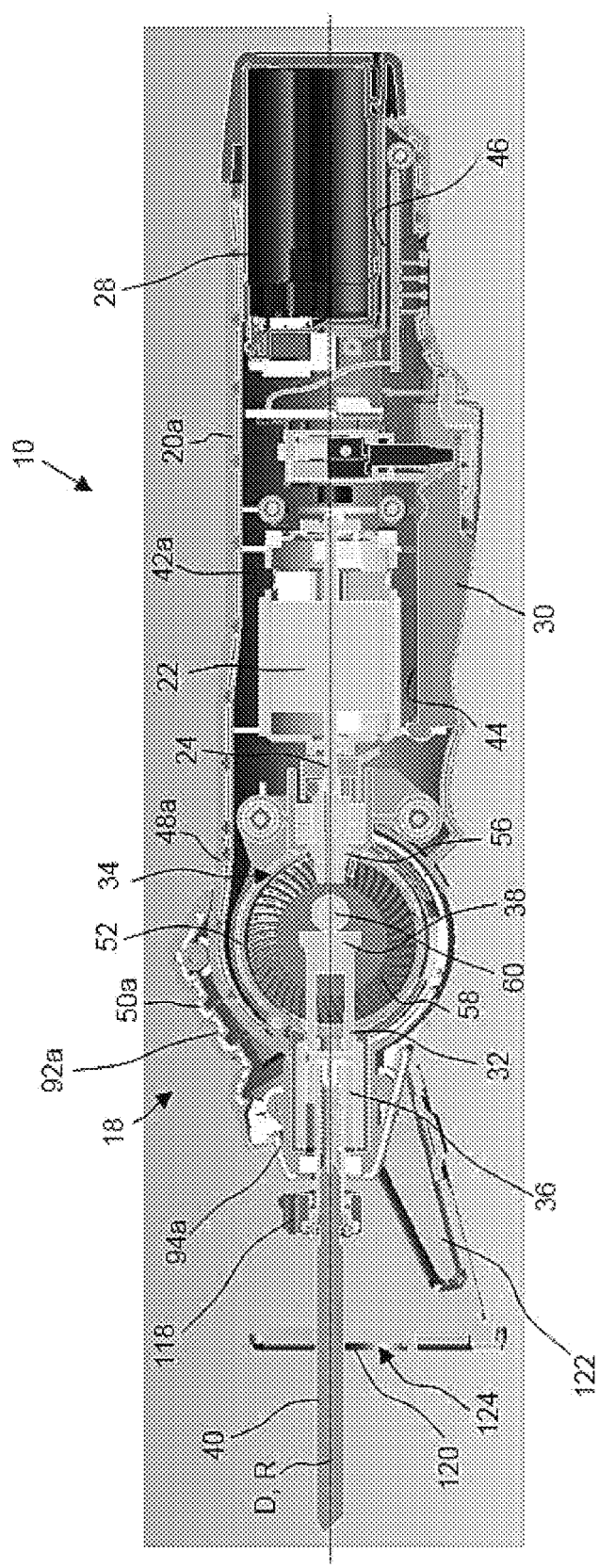
FIG. 2 is a side cross-sectional view of the jig saw of FIG. 1 taken substantially along a center line of the tool showing one of the main housing shells and the internal components of the jig saw.
Figure 3:
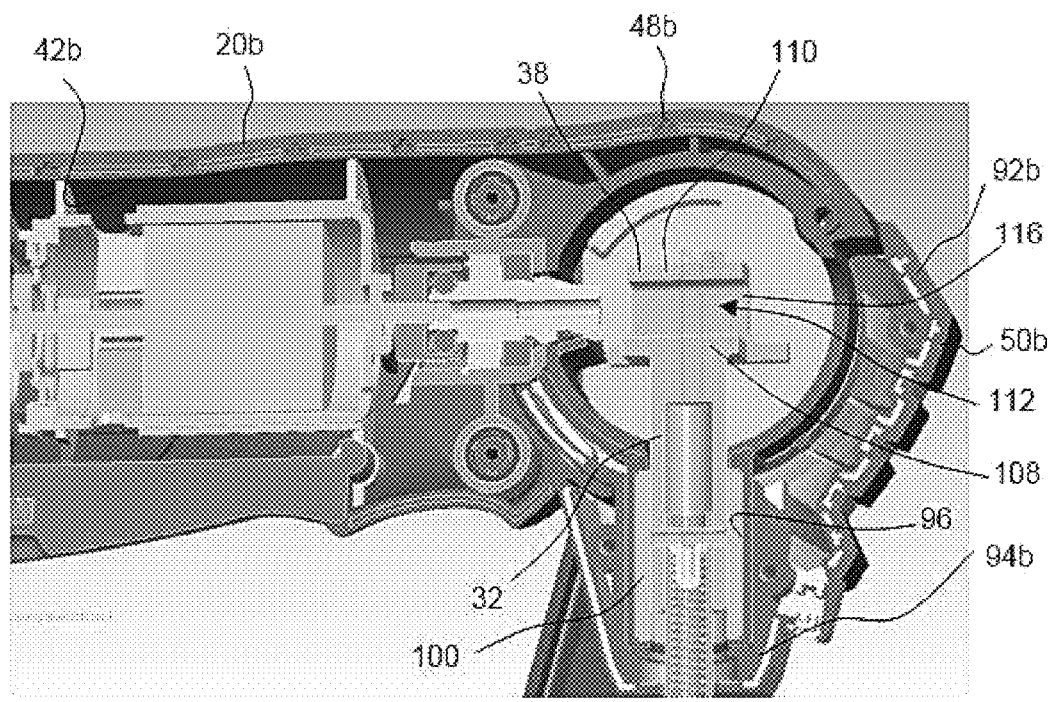
FIG. 3 is a side cross-sectional view of the jig saw of FIG. 1 showing the other main housing shell.
Figure 4:
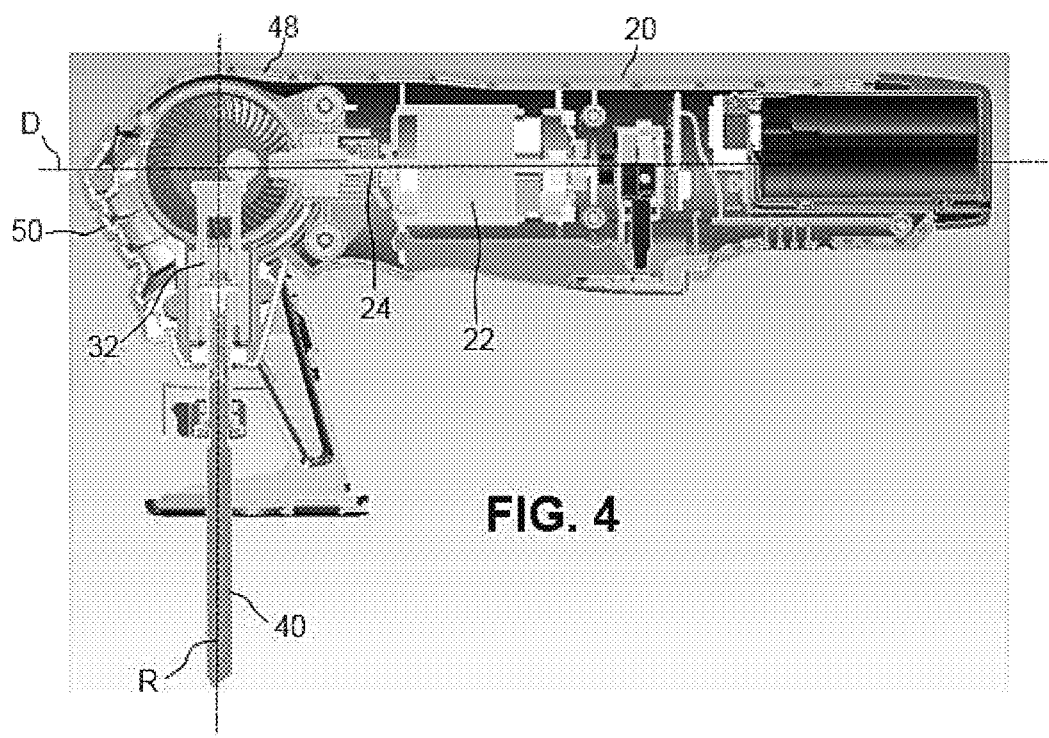
FIG. 4 is a side cross-sectional view of the jig saw of FIG. 1 showing the plunger oriented perpendicularly with respect to the drive axis of the motor.
Figure 5:
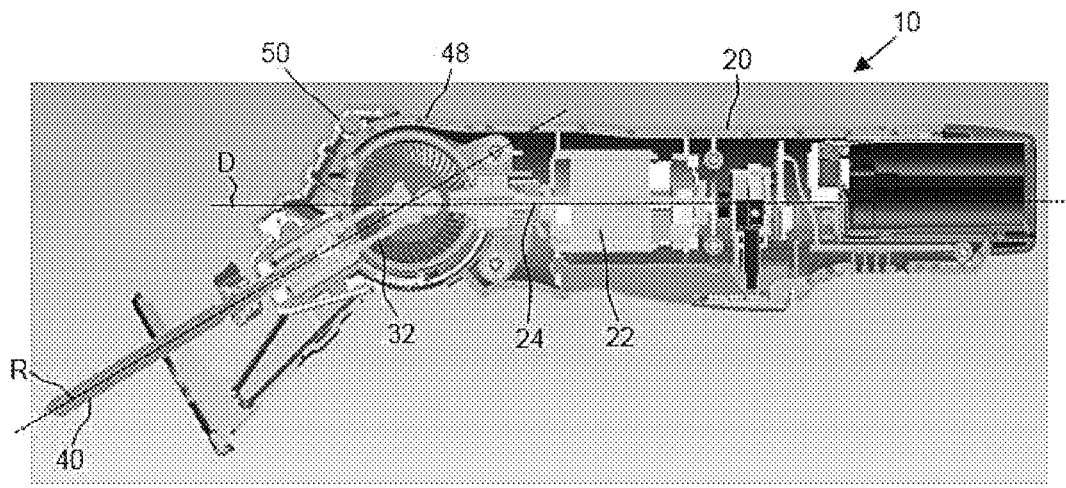
FIG. 5 is a side cross-sectional view of the jig saw of FIG. 1 showing the plunger oriented at approximately a 30° with respect to the drive axis of the motor.

In one embodiment, the main housing has a clamshell configuration including a first main housing shell 20a (FIG. 2) and a second main housing shell 20b (FIG. 3). As depicted in FIGS. 2 and 3, the main housing shells 20a, 20b include interior walls 42a. 42b that meet to define a battery receptacle 46 and a motor compartment 44. The main housing shells 20a, 20b include gear housing portions 48a, 48b configured to operably support and retain the articulating drive assembly 34. The housings 20a, 20b are formed of suitable rigid, durable materials, including hard plastics and metals. In one embodiment, the gear housing portions 48a, 48b are integrally formed with the respective main housing shells 20a, 20b.

The articulating head portion 18 includes a plunger 32. The plunger 32 is configured to reciprocate along a reciprocating axis R within the articulating head portion 18 of the jig saw 10. The plunger 32 includes a blade holder end portion 36 and a yoke end portion 38. The blade holder end portion 36 is configured to releasably retain a cutting blade 40 in alignment with the reciprocating axis R.

With reference to FIG. 2, the motor 22 and output shaft 24 define a drive axis D for the jig saw 10. The motor 22 is configured to drive the output shaft 24 to rotate about the drive axis D. The articulating drive assembly 34 is coupled between the output shaft 24 of the motor 22 and the yoke end portion 38 of the plunger 32. The yoke end portion of the plunger cooperates with the articulating drive assembly 34 to convert the rotational movement of the output shaft 24 into a linear, reciprocating drive motion for the plunger 32.

Figure 6:
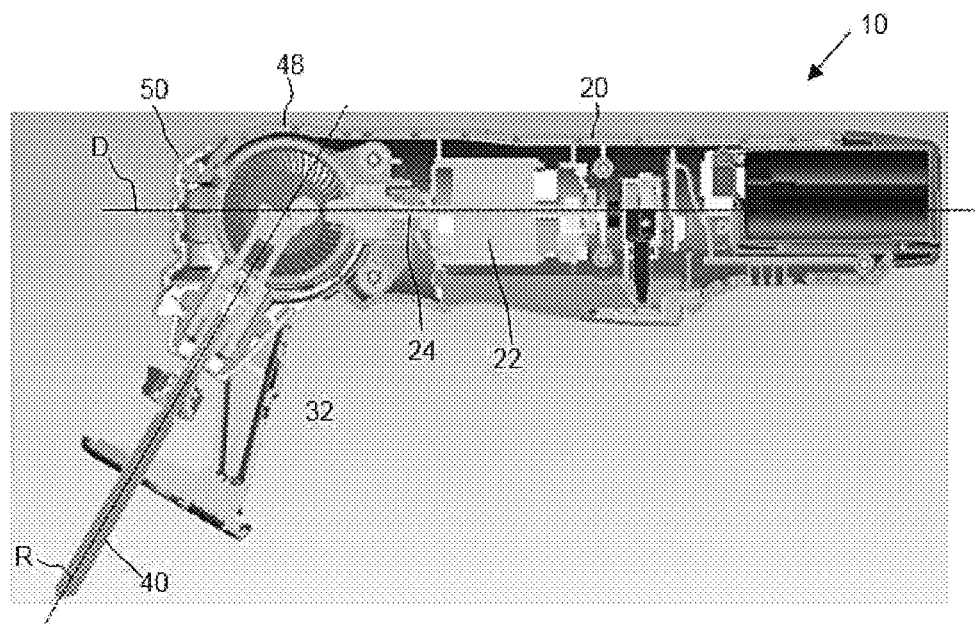
FIG. 6 is a side cross-sectional view of the jig saw of FIG. 1 showing the plunger oriented at approximately 60° with respect to the drive axis of the motor.

The articulating head portion 18 includes an articulating housing 50 that is configured to pivot with respect to the main body portion 14 of the jig saw to allow the plunger 32 to be oriented at a plurality of positions with respect to the main body portion of the jig saw. Referring to FIGS. 2 and 4-6, the articulating head portion is configured to pivot with respect to the main body portion between a first position (FIG. 2) in which the plunger is oriented with the reciprocating axis R aligned substantially coaxially with the drive axis D of the motor (0°), and a second position (FIG. 4) in which the plunger is oriented with the reciprocating axis R arranged substantially perpendicularly with respect to the drive axis D (90°). The articulating head portion 18 is also configured to allow the plunger 32 to be oriented with the reciprocating axis R at a plurality of intermediate positions with respect to the drive axis D including, for example, approximately 30° (FIG. 5) and approximately 60° (FIG. 6).

The articulating housing 50 supports the plunger 32 such that the reciprocating axis R and the drive axis D reside substantially in the same plane S (FIG. 9) at each possible position or orientation of the plunger 32 with respect to the main body portion 14. Thus, the articulating drive assembly 34 is able to drive the plunger 32 to reciprocate along the reciprocating axis R at any orientation between approximately 0° and approximately 90° with respect to the drive axis D.

Figure 7:
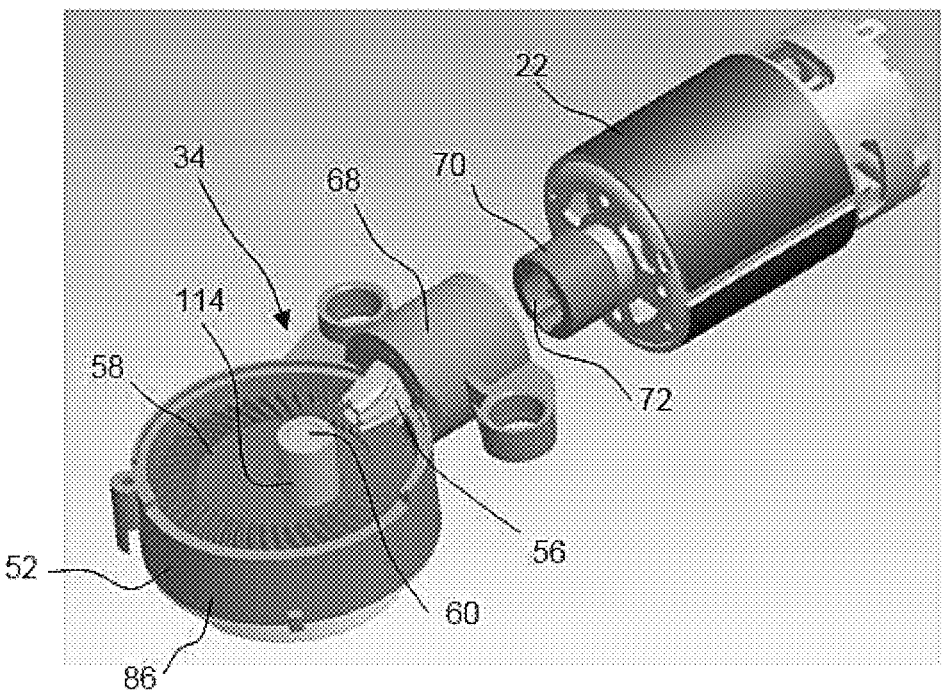
FIG. 7 is a perspective view of the motor and articulating drive assembly of the jig saw of FIG. 1 shown removed from the jig saw.
Figure 8:
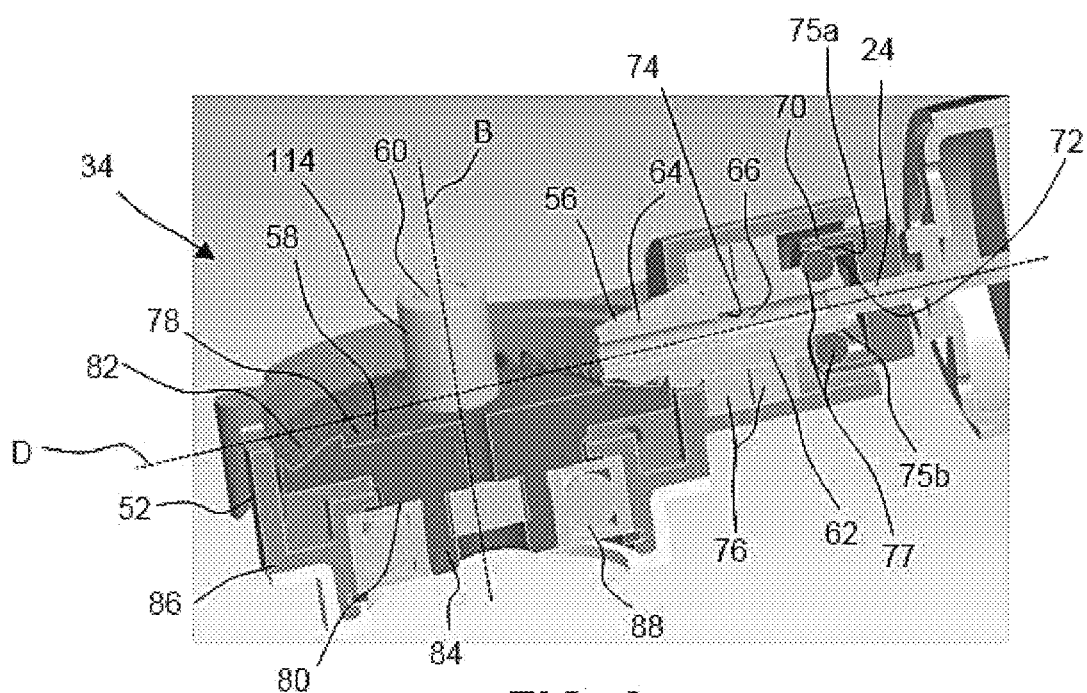
FIG. 8 is a cross-sectional view of the articulating drive assembly of FIG. 7 coupled to the output shaft of the motor.
Figure 9:
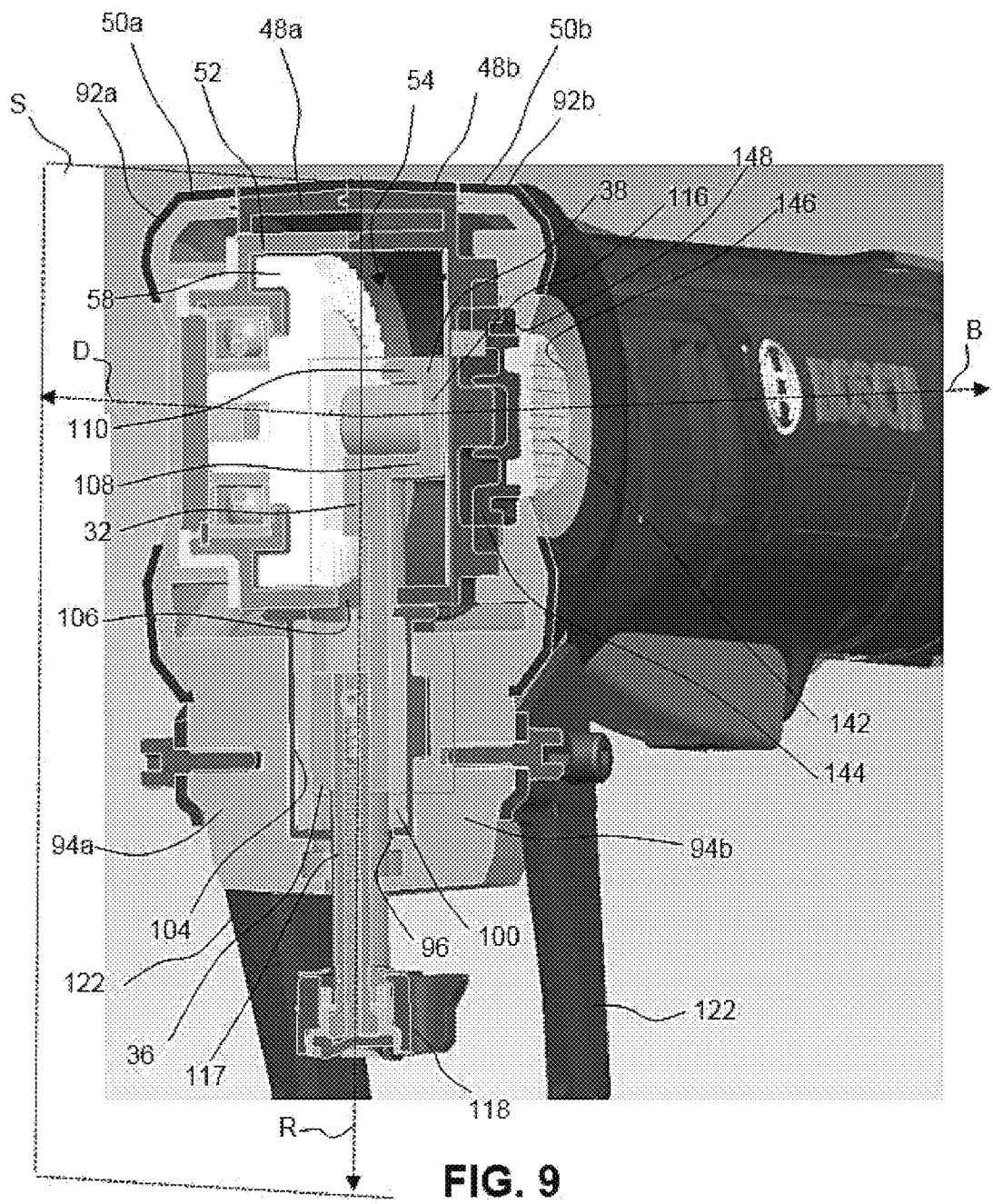
FIG. 9 is a cross-sectional view of the articulating head portion of the jig saw of FIG. 1.

Referring to FIGS. 7 and 8, the articulating drive assembly 34 includes a pinion gear (drive gear) 56, a bevel gear (driven gear) 58, and a crank pin 60. In the embodiment of FIGS. 1-9, the pinion gear 56, bevel gear 58, and crank pin 60 are operably supported and retained by a gear support member 52. The gear support member 52 in turn is removably retained by the gear housing portion 48a of the first main housing shell 20a as depicted in FIG. 2. This configuration enables the articulating drive assembly 34 to be installed and removed from the gear housing portion 48a of the first main housing shell 20a as a unit. The gear housing portion 48b (FIG. 3) of the second housing shell 20b is configured to serve as a cover for the gear support member 52. The gear support member 52 and the gear housing portion 48b of the second housing shell 20b each include walls and interior surfaces that collectively define a gear compartment 54 (FIG. 9).

Referring again to FIGS. 7 and 8, the pinion gear 56 has a shaft portion 62 and a gear head portion 64. The shaft portion 62 of the pinion gear 56 is coupled to the output shaft 24 of the motor 22 for rotation therewith about the drive axis D. In one embodiment, a coupling member 70 is installed on the output shaft 24 and couples the output shaft 24 to shaft 62 of the pinion gear 56. The coupling member 70 has a generally cylindrical configuration that defines a passage 72 that is centered around the output shaft 24 of the motor.

The passage 72 is fitted over the shaft 62 of the pinion gear. The trailing end portion of the pinion shaft defines a bore 66 in which the output shaft 22 of the motor is received. The outer surface of the shaft of the pinion gear and the interior wall of the coupling member define complementary shaped and positioned grooves 75a, 75b that cooperate to define channels for receiving ball bearings 77. The ball bearing engages the grooves 75a, 75b on the coupling member 70 and the shaft 62 of the pinion gear 56 to removably secure the shaft 62 to the coupling member 70.

The gear support member 52 includes a pinion gear support structure 68 that supports and retains the pinion gear 56 in a desired orientation relative to the output shaft 24 and coupling member. The pinion gear support structure 68 has a generally cylindrical configuration that defines an open-ended passage 74 leading to the gear compartment 54. The shaft 62 of the pinion gear 56 extends through the passage 74 to position the gear head portion 64 of the pinion gear at least partially within the gear compartment 54 defined in the gear housing. The shaft 62 of the pinion gear 56 is rotatably supported in the passage 74 by bearings 76.

The bevel gear 58 is positioned within the gear compartment 54 in meshing engagement with the gear head portion 64 of the pinion gear 56. The bevel gear 58 is substantially disc-shaped having a first main surface 78 and a second main surface 80 located on opposite sides of the bevel gear. The first main surface 78 includes a geared portion 82 configured for meshing engagement with the gear head 64 of the pinion gear 56. A spindle 84 extends from the second main surface 80 that defines the axis of rotation B of the bevel gear 58.

The gear support member 52 includes a bevel gear support structure 86 that rotatably supports the spindle portion 84 of the bevel gear 58 for rotation about a bevel axis B that is substantially perpendicular to the drive axis D. As depicted in FIG. 8, the bevel gear support structure 86 includes a bearing 88 that rotatably supports the spindle portion 84 of the bevel gear. The bevel gear 58 is freely rotatably relative to the roller bearing 88. Therefore, as the pinion gear 56 is driven to rotate about the drive axis D by output shaft 24 of the motor, the bevel gear 58 is driven to rotate about the bevel axis B by the pinion gear 56.

The crank pin 60 of the articulating drive assembly 34 protrudes from the first main surface 78 of the bevel gear 58 at a position that is offset a predetermined distance from the bevel axis B of the bevel gear. As the bevel gear 58 is rotated by the pinion gear 56, the crank pin 60 rotates with the bevel gear 58 in a circular path centered on the bevel axis B. In one embodiment, the crank pin 60 is received in a bore (not shown) defined in the bevel gear.

Referring to FIG. 9, the crank pin 60 is operably coupled to the yoke end portion 38 of the plunger 32 within the gear compartment 54. The plunger 32 extends from the yoke end portion 38 through a slot 106 defined between the gear support member 52 and the gear housing portion 48b. The plunger 32 is reciprocatingly supported by the articulating housing 50 exterior to the gear compartment 54. The articulating housing 50 supports the plunger 32 with the reciprocating axis R of the plunger in the same plane S with the drive axis D and intersecting the bevel axis B.

The articulating housing 50 comprises a shroud portion 92 and a nose portion 94. To enable articulation, the articulating housing 50 has a clamshell configuration that enables the articulating housing to be supported on the gear housing portion of the main housing without having to fasten the articulating housing directly to the main housing 20. In one embodiment, the articulating housing 50 comprises a first articulating housing shell 50a and a second articulating housing shell 50b. The first articulating housing shell 50a includes a first shroud portion 92a and a first nose portion 94a, and the second articulating housing shell 50b includes a second shroud portion 92b and a second nose portion 94b.

The assembled shroud portions 92a, 92b are removably supported by the assembled gear housing portions. The nose portions 94a, 94b combine to define an open-ended passage 96 that extends between and connects the gear compartment 54 to the exterior of the articulating housing 50. The body of the plunger 32 is reciprocatingly supported in the passage 96. The body of the plunger 32 is supported in the passage 96 by a linear bearing 100. The nose portion 94 of the housing defines a bearing space 104 that retains and positions the linear bearing 100 in relation to the gear housing. The plunger 32 supports a blade holder assembly 117 that extends from the passage 96 to position the blade holder end portion 36 exterior to the articulating housing 50. The plunger 32 also extends from the passage through a slot 106 defined between the gear support member 52 and the gear housing portion 48b to position the yoke end portion 38 of the plunger in engagement with the crank pin 60.

The yoke end portion 38 of the plunger 32 is configured to convert the circular movement of the crank pin 60 into a linear, reciprocating movement of the plunger 32. In one embodiment, the yoke end portion 38 includes a first wall portion 108 and a second wall portion 110 that are spaced apart from each other to define a guide slot 112 in which the crank pin 60 is translatably received. The first wall portion 108 and the second wall portion 110 are each oriented substantially perpendicular to the reciprocating axis R. As the crank pin 60 moves in directions that are relatively parallel to the axis R of the plunger, the crank pin 60 engages the wall portions 108, 110 resulting in a back and forth reciprocating movement of the plunger along the reciprocating axis R.

The wall portions 108, 110 are configured to allow the crank pin 60 to translate back and forth within the slot 112 in directions perpendicular to the axis R of the plunger. The distance that the wall portions are configured to allow the crank pin 60 to translate corresponds to the diameter of the circular path of the crank pin 60. A roller housing 114 or similar type of structure is positioned on the crank pin 60 to facilitate translational movement of the crank pin 60 with respect to the walls 108, 110 in the slot 112.

In one embodiment, the yoke end portion 38 includes a wall connector portion 116 that extends over the top of the crank pin 60 to connect and position the wall portions 108, 110 in relation to the each other. The wall connector portion 116 is located between the top surface of the crank pin and the gear housing portion 48b. As the crank pin 60 rotates with the bevel gear 58, the crank pin 60 engages the yoke end portion 38 of the plunger 32 causing the plunger 32 to reciprocate along the reciprocating axis R.

The blade holder assembly 117 of the plunger 32 includes a blade clamping assembly 118 that releasably secures the cutting blade 40 so that the reciprocating movement of the plunger can be used to drive the cutting blade to perform cutting operations. As best seen in FIGS. 1 and 2, a foot plate 120 is attached to the nose portion 94 of the articulating housing 50 that provides a generally flat support for the jig saw during a cutting operation. The foot plate 120 is attached to the nose portion 94 by leg members 122. The foot plate 120 defines an opening 124 through which the cutting blade 40 extends.

The exterior surface of the assembled gear housing portions 48a, 48b are configured to serve as an articulation guide frame that allows the assembled shroud portions 92a, 92b of the articulating housings 50a, 50b to rotate a predetermined degree with respect to the gear housing portions 48a, 48b. An articulation button 142 is incorporated into the gear housing portion 48b of the main housing shell 20b that enables the articulating housings 50a, 50b to be releasably locked with respect to the gear housing portions 48a, 48b at a plurality of different orientations. As depicted in FIGS. 1 and 9, the articulation button 142 extends through an opening 146 defined in the shroud portion 92b of the articulating housing shell 50b. The articulation button 142 includes a plurality of teeth 144 that project radially from the articulation button 142 in directions that are substantially perpendicular to the axis of rotation B of the articulating housings 50a, 50b relative to the gear housing portions 48a, 48b.

The interior surface of the articulating housing portion 92b defines a plurality of teeth receiving structures 148 surrounding the opening 146 that are configured and positioned complementary to the plurality of teeth 144 extending radially from the articulation button. The articulation button 142 is configured to move between an extended position and a depressed position with respect to the gear housing portion 48b. In the depressed position, the articulation button 142 and plurality of teeth 144 are positioned adjacent to the gear housing portion 48b and away from the teeth receiving structures 148. In the extended position, the articulation button 142 and plurality of teeth 144 are spaced apart from the gear housing portion 48b and positioned adjacent the teeth receiving structures 148. A biasing member (not shown), such as a biasing spring, is used to bias the articulation button 142 into the extended position.

When the articulation button 142 is biased into the extended position, the articulation button 142 extends through the opening 146 and the plurality of teeth 144 are positioned in interlocking engagement with the teeth receiving structures 148 thus locking the articulating housings 50a, 50b in position with respect to the gear housing portions 48a, 48b. To articulate the articulating housing 50 with respect to the gear housing portions 48a, 48b, an operator of the jig saw 10 applies force to the articulation button 142 to move the articulation button 142 to the depressed position. In the depressed position, the plurality of teeth 144 are disengaged from the teeth receiving structures 148 thereby permitting the articulating housings 50a, 50b to rotate with respect to the gear housing portions 48a, 48b. When the articulating housing 50 is rotated to the desired orientation, the operator reduces the force applied to the articulating button 142 which allows the articulation button 142 to be biased into the extended position where the plurality of teeth 144 are again placed in interlocking engagement with the teeth receiving structures 148.

As the shroud portion 92 of the articulating housing 50 rotates with respect to the gear housing portions 48a, 48b, the nose portion 94 of the articulating housing 50 pivots with respect gear housing about the bevel axis B. The nose portion 94 supports the plunger 32 such that the reciprocating axis R intersects the pivot axis P throughout the pivotal movement of the nose portion 94 of the housing with respect to the gear housing. As a result, the yoke end portion 38 of the plunger 32 is maintained within the gear compartment 54 in engagement with the crank pin 60 regardless of the orientation of the nose portion 94 of the housing 50 with respect to the gear housing portions 48a, 48b.

In the embodiment of FIGS. 1-9, the articulating drive assembly 34 is supported and retained by the gear housing portions 48a, 48b of the main housing 20. FIGS. 10-13 depict an alternative embodiment of an articulating jig saw 200 including a gear housing for the articulating drive assembly 34 that comprises a separate component that is mounted onto the main housing.

Figure 10:
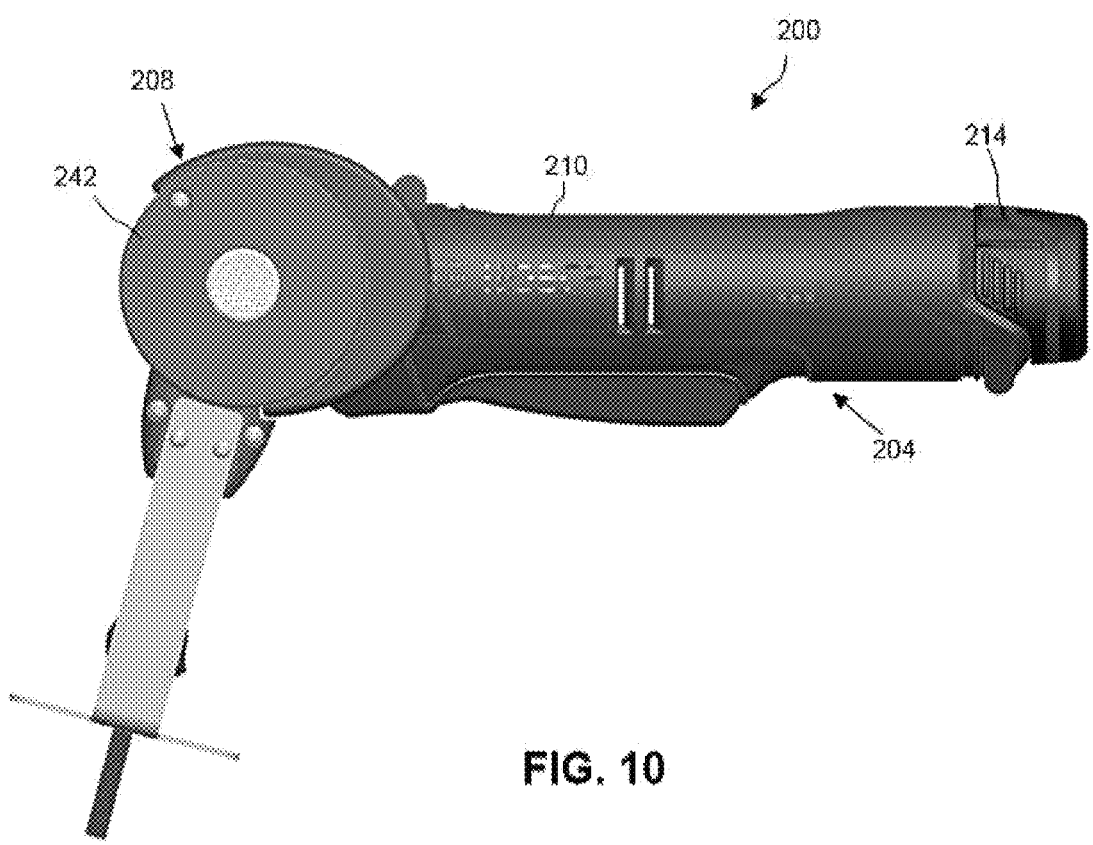
FIG. 10 is a side view of another embodiment of an articulating jig saw.
Figure 11:
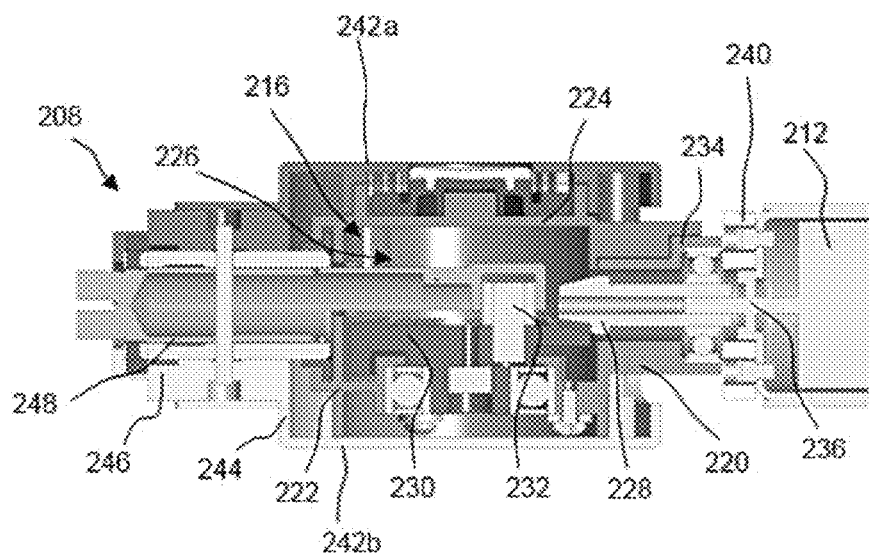
FIG. 11 is a top cross-sectional view of the articulating head portion of the jig saw of FIG. 10.
Figure 12:
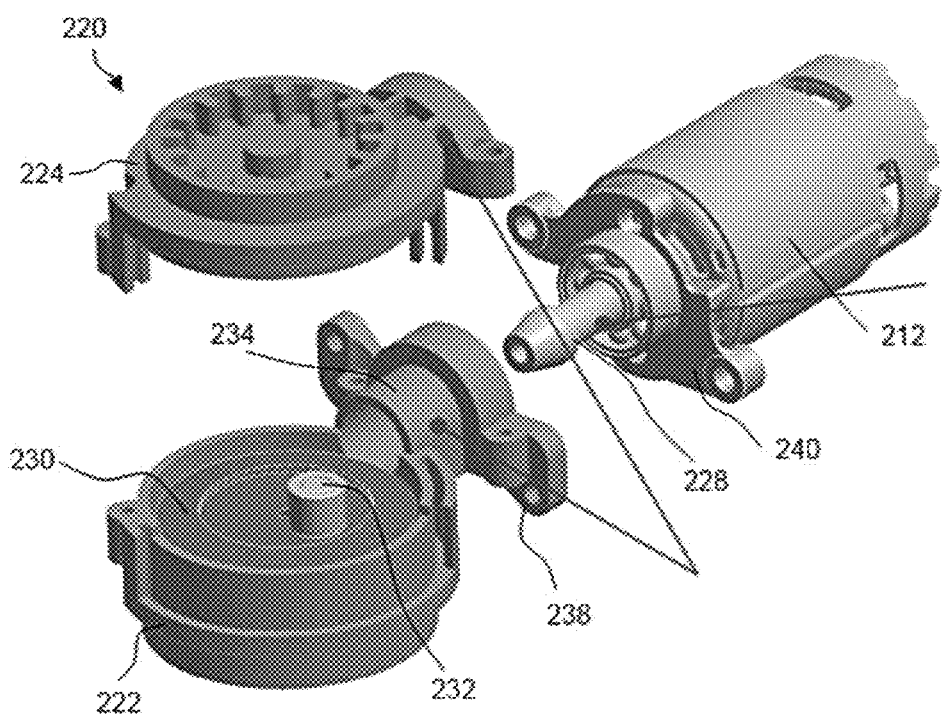
FIG. 12 is a perspective view of the articulating drive assembly of the jig saw of FIGS. 10 and 11.

Referring to FIGS. 10-12, the jig saw 200 includes a main body portion 204 and an articulating head portion 208. The main body portion 204 comprises a main housing 210 that supports and retains a motor 212, a battery 214, an articulating drive assembly 216, and associated electronics for powering the jig saw 200.

Referring to FIGS. 11 and 12, the main body portion 204 includes a gear housing 220. The gear housing 220 includes a gear support portion 222 and a gear cover portion 224. The gear support portion 222 and the gear cover portion 224 each include walls and interior surfaces that collectively define a gear compartment 226. The gear cover portion 224 is attached to the gear support portion 222 by fasteners (not shown), such as threaded bolts, to substantially enclose the gear compartment 226.

The articulating drive assembly 216 includes a pinion gear (drive gear) 228, a bevel gear (driven gear) 230, and a crank pin 232. The articulating drive assembly 216 operates in substantially the same manner as the articulating drive assembly 34 of the embodiment of FIGS. 1-9.

In the embodiment of FIGS. 10-12, the gear support portion 222 of the gear housing 220 includes a pinion gear support structure 234 that supports and retains the pinion gear 228 in a desired orientation relative to the gear housing 220 and the output shaft 236 of the motor 212. The pinion gear support structure 234 includes an attachment portion 238 that is used to attach the gear support portion 222 of the gearing housing 220 to the main body portion 204.

The main body portion 204 of the jig saw 200 includes a gear housing mounting plate 240 that is secured to the output end portion of the motor 212. The attachment portion 238 of the pinion gear support structure 234 is removably attached to the gear housing mounting plate 240 by fasteners, such as threaded bolts (not shown).

The articulating head portion 208 includes an articulating housing 242 comprising housing shells 242a, 242b that define a shroud portion 244 and a nose portion 246. The shroud portion 244 of the articulating housing 242 is removably supported by the gear housing 220. The nose portion 246 of the articulating housing 242 supports the plunger 248.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A power tool comprising:
   a motor housing including a motor having an output shaft, the motor being configured to rotate the output shaft about a drive axis,
   a gear housing including a gear support portion and a gear cover portion, the gear cover portion being non-movably attached to the gear support portion, the gear support portion and the gear cover portion cooperating to substantially enclose a gear compartment and defining a slot therebetween;
   a pinion gear rotatably supported by the gear housing, the pinion gear being coupled to the output shaft for rotation about the drive axis;
   a bevel gear rotatably supported by the gear support portion of the gear housing in the gear compartment for rotation about a bevel axis that is perpendicular to the drive axis, the bevel gear including a geared portion that is meshingly engaged with the pinion gear;
   a crank pin arranged on a same side of the bevel gear as the geared portion at a position offset from the bevel axis, the crank pin defining a circular path centered on the bevel axis when the bevel gear is rotated;
   an articulating housing including a first housing shell and a second housing shell attached to each other to form a shroud portion and a nose portion, the shroud portion enclosing the gear housing and being pivotably supported by the gear housing for pivotal movement about the bevel axis, the nose portion being pivoted about the bevel axis along with the shroud portion; and
   a plunger member supported by the nose portion of the articulating housing for reciprocating movement along a reciprocating axis, the plunger member extending from the nose portion through the slot defined in the gear housing and into the gear compartment, the plunger member including i) a yoke end portion located in the gear compartment and coupled to the crank pin in the gear compartment and ii) a blade holder end portion located exterior to the articulating housing,
   wherein the reciprocating axis and the drive axis reside in the same plane throughout the pivotal movement of the articulating housing with respect to the gear housing, and
   wherein the articulating housing supports the plunger member so that the plunger pivots with respect to the gear housing along with the articulating housing.

2. The power tool of claim 1, wherein the reciprocating axis intersects the bevel axis throughout the pivotal movement of the articulating housing with respect to the gear housing.

3. The power tool of claim 1, wherein the yoke end portion is configured to allow the crank pin to translate with respect to the yoke end portion in directions perpendicular to the reciprocating axis when the crank pin is moved along the circular path so that the plunger member is supported with the reciprocating axis intersecting the bevel axis throughout the reciprocating movement of the plunger member.

4. The power tool of claim 1, wherein the first housing shell and the second housing shell are attached to each other in a clamshell configuration around the gear housing.

5. The power tool of claim 1, wherein:
   the articulating housing is pivotable between a first position and a second position in relation to the gear housing;
   in the first position, the plunger member is oriented perpendicular to the drive axis; and
   in the second position, the reciprocating axis of the plunger member is coaxially aligned with the drive axis.

6. The power tool of claim 5, wherein the articulating housing is configured to be releasably secured to the gear housing portion at any one of plurality of positions between and including the first position and the second position.

7. The power tool of claim 1, further comprising:
a foot plate secured to the nose portion of the articulating housing, the foot plate defining an opening through which the blade extends.

8. The power tool of claim 1, wherein:
the yoke end portion includes a first wall portion and a second wall portion;
the first wall portion and the second wall portion are oriented perpendicular to the reciprocating axis; and
the crank pin is received between the first wall portion and the second wall portion.

9. The power tool of claim 8, wherein:
the yoke end portion further includes a wall connector portion that extends over the crank pin to position the first wall portion and the second wall portion with respect to each other.

10. The power tool of claim 1, wherein the gear housing is removably attached to the motor housing.

11. An articulating drive assembly for a power tool, comprising:
a gear housing configured to be removably attached to a motor housing of the power tool, the gear housing including a gear support portion and a gear cover portion, the gear cover portion being non-movably attached to the gear support portion, the gear support portion and the gear cover portion cooperating to substantially enclose a gear compartment and defining a slot therebetween;
a pinion gear rotatably supported by the gear housing, the pinion gear being coupled to an output shaft extending from the motor housing of the power tool for rotation about the drive axis;
a bevel gear rotatably supported by the gear support portion of the gear housing in the gear compartment for rotation about a bevel axis that is perpendicular to the drive axis, the bevel gear including a geared portion that is meshingly engaged with the pinion gear;
a crank pin arranged on a same side of the bevel gear as the geared portion at a position offset from the bevel axis, the crank pin defining a circular path centered on the bevel axis when the bevel gear is rotated;
an articulating housing including a first housing shell and a second housing shell attached to each other to form a shroud portion and a nose portion, the shroud portion enclosing the gear housing and being pivotably supported by the gear housing for pivotal movement about the bevel axis, the nose portion being pivoted about the bevel axis along with the shroud portion; and
a plunger member supported by the nose portion of the articulating housing for reciprocating movement along a reciprocating axis, the plunger member extending from the nose portion through the slot defined in the gear housing and into the gear compartment, the plunger member including i) a yoke end portion located in the gear compartment and coupled to the crank pin in the gear compartment and ii) a blade holder end portion located exterior to the articulating housing,
wherein the reciprocating axis and the drive axis reside in the same plane throughout the pivotal movement of the articulating housing with respect to the gear housing, and
wherein the articulating housing supports the plunger member so that the plunger pivots with respect to the gear housing along with the articulating housing.

12. The power tool of claim 11, wherein the reciprocating axis intersects the bevel axis throughout the pivotal movement of the articulating housing with respect to the gear housing.

13. The power tool of claim 11, wherein the yoke end portion is configured to allow the crank pin to translate with respect to the yoke end portion in directions perpendicular to the reciprocating axis when the crank pin is moved along the circular path so that the plunger member is supported with the reciprocating axis intersecting the bevel axis throughout the reciprocating movement of the plunger member.

* * * * *

UNITED STATES PATENT AND TRADEMARK OFFICE
CERTIFICATE OF CORRECTION

PATENT NO. : 10,160,048 B2  
APPLICATION NO. : 15/675971  
DATED : December 25, 2018  
INVENTOR(S) : Weir et al.

Page 1 of 1

It is certified that error appears in the above-identified patent and that said Letters Patent is hereby corrected as shown below:

On the Title Page

In item (72), Inventor #3, Ron Llanes's residence should read "Lisle, IL (US)"

Signed and Sealed this
Twenty-fifth Day of June, 2019

Andrei Iancu
*Director of the United States Patent and Trademark Office*